United States Patent
Wolff et al.

(10) Patent No.: US 11,582,610 B1
(45) Date of Patent: Feb. 14, 2023

(54) AUTOMATED SECURITY CONTROL USING LOG INFORMATION

(71) Applicant: T-Mobile USA, Inc., Bellevue, WA (US)

(72) Inventors: Hanne Inez Wolff, Kirkland, WA (US); Myles Anthony Handy, Newcastle, WA (US); Ivan Avilla, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 57 days.

(21) Appl. No.: 17/352,115

(22) Filed: Jun. 18, 2021

(51) Int. Cl.
*H04W 12/122* (2021.01)
*H04W 8/18* (2009.01)
*H04W 12/40* (2021.01)

(52) U.S. Cl.
CPC ......... *H04W 12/122* (2021.01); *H04W 8/183* (2013.01); *H04W 12/40* (2021.01)

(58) Field of Classification Search
CPC .... H04W 12/122; H04W 12/40; H04W 8/183
See application file for complete search history.

(56) References Cited

U.S. PATENT DOCUMENTS

| | | | | |
|---|---|---|---|---|
| 9,843,624 B1* | 12/2017 | Taaghol | ............... | H04L 41/0803 |
| 10,039,073 B2* | 7/2018 | Kakani | ................... | G01S 5/14 |
| 10,074,374 B2* | 9/2018 | Brands | ................ | H04L 63/0861 |
| 10,103,990 B2* | 10/2018 | McCollum | ............... | H04L 47/11 |
| 10,154,453 B2* | 12/2018 | Kumar | ................... | H04W 8/183 |
| 10,365,376 B2* | 7/2019 | Lee | ............................ | G01S 1/04 |
| 10,433,276 B2* | 10/2019 | Gunnarsson | ........ | H04W 64/003 |
| 10,924,609 B1* | 2/2021 | Piscopo, Jr. | ...... | H04M 3/42102 |
| 2011/0314518 A1* | 12/2011 | Ding | ..................... | H04W 12/06 726/4 |
| 2019/0377055 A1* | 12/2019 | Offermans | ................ | G01S 1/24 |
| 2020/0356878 A1* | 11/2020 | Lakshmipathy | ........ | G06N 5/003 |
| 2021/0329417 A1* | 10/2021 | Priyanto | .............. | H04B 7/0617 |
| 2022/0244337 A1* | 8/2022 | Peterson | ................. | G01S 7/282 |

* cited by examiner

*Primary Examiner* — Viral S Lakhia
(74) *Attorney, Agent, or Firm* — Lee & Hayes, P.C.

(57) ABSTRACT

Techniques, devices, and systems for receiving, from a mobile device, a request associated with a subscriber information module (SIM) are described herein. At least one of the mobile device, the SIM, or a communication identifier can be determined. A query can be transmitted, based on a difference between a first time associated with the query and a second time associated with a previous query meeting or exceeding a threshold amount of time. An action can be performed based on the query information being associated with the malicious activity information.

18 Claims, 4 Drawing Sheets

AUTOMATED SECURITY CONTROL USING LOG INFORMATION

BACKGROUND

A subscriber identity module (SIM) is a component of a user equipment (UE) that can store data, such as a unique serial number associated with the SIM, an international mobile subscriber identity (IMSI) number, security authentication data, contact data, capability data, service data, and/or the like. In some examples, a SIM can be an integrated circuit (e.g., a "SIM card") that can be inserted and removed from a UE. In some examples, a SIM can be an embedded-SIM (eSIM), which can be a programmable SIM that is embedded directly into a UE. In some examples, user accounts associated with SIMs are vulnerable to fraudulent attacks. As a result, malicious actors can obtain access to the user accounts, perform SIM swaps, and/or obtain private access codes. This can result in undesirable disclosure of information, detrimental utilization of user accounts, and/or unauthorized transfers of funds.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
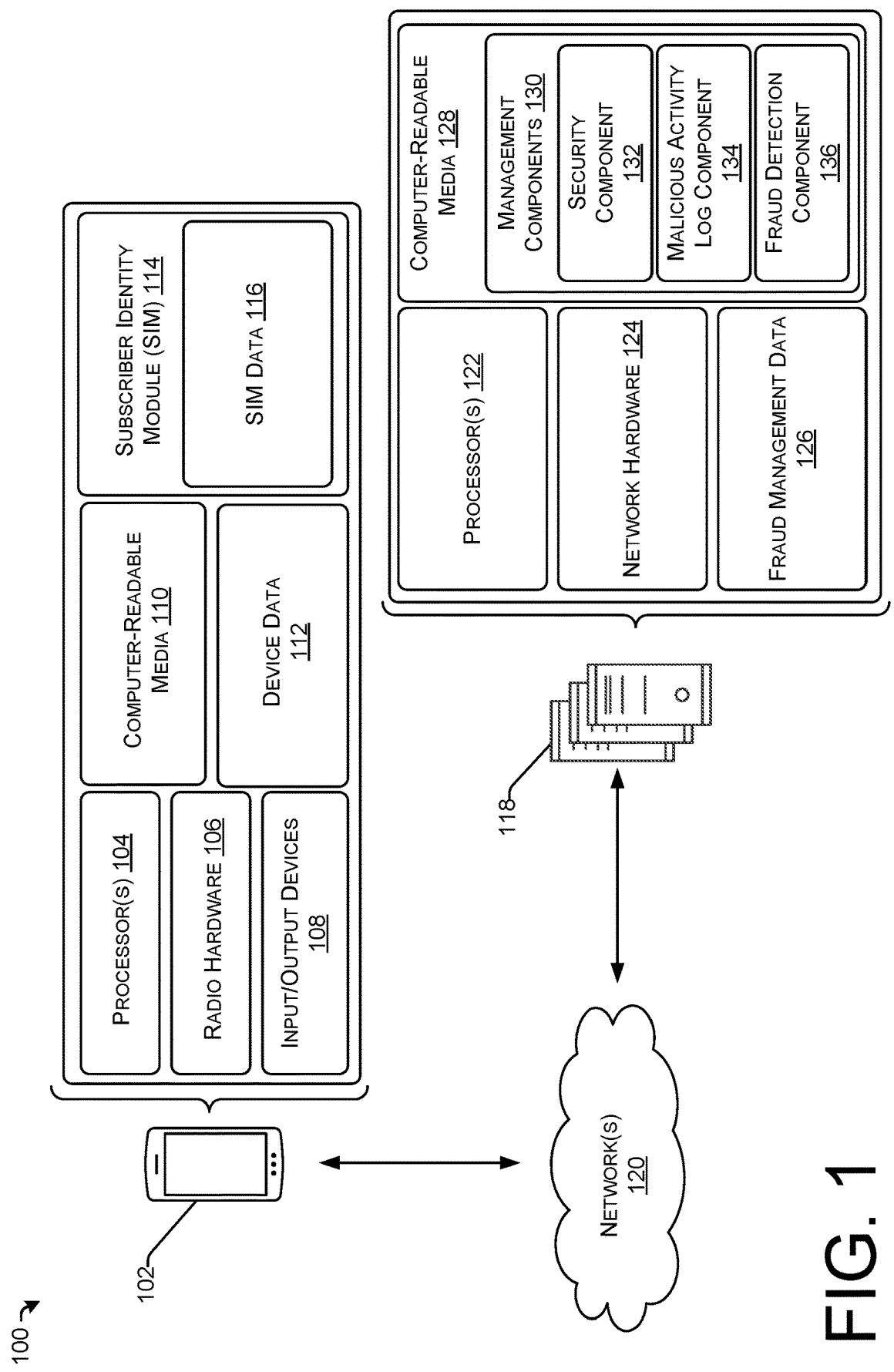
FIG. 1 schematically illustrates a system for automated security control using log information to determine fraud related activity, in accordance with some examples of the present disclosure.

Techniques described herein are directed to systems and methods for automated security control using log information to determine fraud related activity. A security controller, a logging tool, and a fraud manager can interoperate to perform security operations based on user requests. The security controller can exchange information with the logging tool. The security controller can utilize the information exchanged with the logging tool to determine information in the user requests that is associated with malicious actors. The security controller can exchange information with the fraud manager. The information exchanged with the fraud manager can include the request information associated with the malicious actors. The fraud manager can perform preemptive, contemporaneous, and/or remedial operations based on the malicious actor information.

The security controller can determine whether user requests are associated with the malicious actors. The security controller can determine the user requests are received from mobile devices and manage activities associated with the user requests. The user requests can be associated with user accounts and/or subscriber information modules (SIMs). The security controller can determine information associated with the requests from users. The request information can include one or more of information associated with the user accounts, information associated with the mobile devices, and information associated with the SIMs. The security controller can determine the user requests are associated with the malicious actors based on the request information.

The logging tool can manage information associated with malicious actors. The logging tool can store the malicious actor information in tables based on previous requests being associated with the malicious actors and/or fraud related activity. The malicious actor information can include indicators of compromise (IOCs). The logging tool can retrieve information from the tables based on queries received from the security controller. The logging tool can transmit responses to the security controller based on retrieved information. The retrieved information in the responses can be utilized to indicate the queries are associated with malicious actors. The responses can be utilized by the security controller to generate text files based on the response information. The logging tool can update the tables based on information in the queries.

The fraud manager can perform operations associated with malicious actors. The fraud manager can receive the malicious actor information from the logging tool. The malicious actor information can be received in the text files. The malicious actor information can be utilized by the fraud manger to manage fraud related activity. The fraud manager can determine, predict, prevent, and/or discontinue (also referred to herein as "interrupt" or "terminate") the fraud related activity. The fraud manager can determine other fraud related activity. The fraud manager can transmit the other fraud related activity to the security controller. The other fraud related activity can include information associated with other malicious actors and/or other fraud related activity. The other fraud related activity can be forwarded by the security controller to the logging tool. The other fraud related activity can be utilized by the logging tool to update the tables.

Various implementations described herein improve the resiliency of cellular networks. In some previous cellular networks in which automated fraud control was not performed, network traffic was congested with requests associated with malicious actors, thereby significantly impacting signal transmission quality and degrading the user experience. Furthermore, various computing resources were burdened with processing those requests. In contrast, by identifying, and heading off processing of, those requests, network bandwidth can be reduced, and signal transmission quality can be improved. Moreover, network resources can be conserved for requests from authentic (also referred to herein as "non-malicious") users. Thus, implementations described herein can be advantageously applied to cellular networks, thereby benefiting from the realization of these technological innovations.

The systems, devices, and techniques described herein can be implemented in a number of ways. References are made to the accompanying drawings that form a part hereof, and in which are shown by way of illustration specific configurations or examples, in which like numerals represent like elements throughout the several figures.

Illustrative Systems for Automated Security Control Using Log Information to Determine Fraud Related Activity FIG. 1 schematically illustrates a system 100 for automated security control for user accounts using log information of fraud related activity, in accordance with some examples of the present disclosure. The system 100 can include a user equipment 102. In some examples, the user equipment 102 can be configured with processor(s) 104, radio hardware 106, input/output devices 108, and computer-readable media 110.

In some examples, the user equipment 102 can be any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart ewatch, fitness trackers, etc.), an IoT device, an in-vehicle (e.g., in-car) computer, a television (smart television), set-top-box (STB), desktop computer, an autonomous vehicle, a medical device, and/or the like.

The processor(s) 104 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In some examples, an accelerator can represent a hybrid device, such as one from ZYLEX or ALTERA that includes a CPU course embedded in an FPGA fabric. In various embodiments, the processor(s) 104 can execute one or more components and/or processes to cause the user equipment 102 to perform a variety of functionalities, as set forth above and explained in further detail in the following disclosure. Additionally, each of the processor(s) 104 can possess its own local memory, which also can store program components, program data, and/or one or more operating systems.

The radio hardware 106 provides the user equipment 102 with wireless capabilities, such as connecting to one or more base stations associated with one or more service providers. The radio hardware 106 can include or be incorporated into processors, ASICs, programmable circuits such as FPGAs, or in other ways. In some examples, the radio hardware 106 can include radios associated with one or more radio access technologies (e.g., second generation (2G), third generation (3G), fourth generation (4G), fifth generation (5G), etc.). The user equipment 102 can include additional or alternative hardware to enable the device to access service provider(s) via additional or alternative network(s) (e.g., BLUETOOTH®, WI-FI®, etc.).

The radio hardware 106 can configure the user equipment 102 for transmitting and/or receiving data wirelessly using any suitable wireless communications and/or data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Service provider (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over internet protocol (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future internet protocol (IP)-based service provider technology or evolution of an existing IP-based service provider technology. In some examples, the user equipment 102 can be associated with radio hardware 106 available by either or any service providers with which the user equipment 102 is configured to be operable with.

The user equipment 102 can include input/output device(s) 108. In some examples, the input/output device(s) 108 can include a display, which can output information in a pictorial (or, in some examples, tactile) form. The display can be an electroluminescent display, liquid crystal display, a light-emitting diode display, plasma display, quantum dot display, etc. In some examples, the display can be a touch display, whereby touch of the display is an input method. In some examples, the input/output device(s) 108 can include a speaker, a microphone, a stylus, a mouse, a keyboard, or the like. For the purpose of this discussion, a user can interact with the user equipment 102 via the input/output device(s) 108. That is, a user can provide touch input, speech input, etc. to interact with the user equipment 102. Similarly, the user equipment 102 can output information to the user via presentation on a display, audible output, etc.

Depending on the exact configuration and type of the user equipment 102, the computer-readable media 110, can include computer storage media and/or communication media. The computer storage media can include volatile memory, nonvolatile memory, and/or other persistent and/or auxiliary computer storage media, removable and non-removable computer storage media implemented in any method or technology for storage of data such as computer readable instructions, data structures, program components, or other data. Computer memory is an example of computer storage media. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, service provider attached storage, storage area service providers, hosted computer storage or any other storage memory, storage device, and/or storage medium that can be used to store and maintain data for access by a computing device.

In some examples, the computer storage media can include non-transitory computer-readable media. Non-transitory computer-readable media can include volatile and nonvolatile, removable and non-removable tangible, physical media implemented in technology for storage of data, such as computer readable instructions, data structures, program components, or other data. The computer-readable media 110 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired data and which can be accessed by the user equipment 102. Any such non-transitory computer-readable media can be part of the user equipment 102.

In contrast, communication media includes computer readable instructions, data structures, program components, or other data in a modulated data signal, such as a carrier wave, or other transmission mechanism. As defined herein, computer storage media does not include communication media.

In some examples, device data 112 can be stored on the user equipment 102, for example in a database or other data store. The device data 112 can include, but is not limited to, identification data (e.g., an international mobile subscriber identity (IMSI), etc.) associated with the user equipment 102, an internet protocol (IP) address (e.g., an IP address utilized by the user equipment 102 to connect to the network(s) 120, as discussed below), a service provider login (e.g., an identifier including an account name and an active directory associated with an account provided by a service provider), user account data (e.g., account name, account number, etc.), service provider data (e.g., current service provider, available service providers, service(s) available via the service provider, etc.), brand data (e.g., current brand associated with the user equipment 102, etc.), context data (e.g., which application(s) are executing on the user equipment 102), capability data (e.g., which radio access technology(s) the user equipment 102 is configured to use, etc.), authentication data, and/or the like. In some examples, the device data 112 can indicate device features, including, but not limited to, radio technology (e.g., NR, LTE, UMTS, CDMA, GSM), a frequency band, voice protocol (e.g., voice on UMTS, CDMA, GSM, etc.), messaging (e.g., short message service (SMS) messaging), a speed feature (e.g., carrier aggregation (CA), 4×4 multiple input and multiple output (MIMO), or 256QAM modulation in downlink, etc.), regulatory data (e.g., E911 location, wireless emergency alerts (WEA), etc.), dual SIM lock data, dual device unlock data, IP multimedia subsystem (IMS) services (e.g., voice over LTE (VoLTE), wi-fi calling (WFC), rich communication services (RCS), etc.), mobile hotspot data, accessibility data (e.g., text telephone (TTY), real time text (RTT), etc.), a service provider service (e.g., visual voicemail, account management, name/identification, etc.), a third-party application, a setting (e.g., access point name (APN), browser default, ringtone, splash screen, etc.), a background (e.g., identification applications, analytics applications, etc.), etc.

In some examples, the user equipment 102 can be associated with a SIM 114. In some examples, the SIM 114 can configure the user equipment 102 to operate via a service provider. That is, the SIM 114 can configure the user equipment 102 such that the user equipment 102 can communicate with other user devices via base stations and/or network devices associated with the service provider. Base stations (also known as cell sites or cell towers) can be associated with antennae and other electronic communications equipment (e.g., transceivers, digital signal processors, control electronics, a GPS receiver, etc.) to create a cell. A service provider can have multiple base stations, creating multiple cells, thereby generating a cellular network. In some examples, the SIM 114 can enable the user equipment 102 to access services provided via a core network associated with the service provider. In some examples, such services can include IMS-based services, including but not limited to, telephony services, emergency services (e.g., E911), gaming services, instant messaging services, presence services, video conferencing services, social networking and sharing services, location-based services, push-to-talk services, and so on.

In some examples, the SIM 114 can be a SIM card or an eSIM (e.g., an embedded, electronic, and/or enhanced SIM).

A SIM card can be a portable memory chip or an integrated memory chip. The SIM card can be utilized to access services associated with an account provided by a service provider. The SIM card can be activated based on a request transmitted by a user equipment associated with the SIM card. That is, each SIM card includes a unique number (e.g., an integrated circuit card identifier (ICCID)) printed on the memory chip which requires activation by the service provider (e.g., via a website associated with the service provider, via a call to the service provider, via provisioning by the service provider, etc.). Following activation of the account by the service provider, various services offered by the service provider can be utilized via the user equipment 102.

In some examples, for instance with an eSIM, a profile (e.g., an eSIM profile) including a unique number (i.e., associated with a service provider) and other data (e.g., account data (e.g., a subscription key, an account number, and/or service plan profile(s), etc.), restriction(s), etc.) can be downloaded by the user equipment 102, and no further activation is required to activate an account associated with the service provider and/or otherwise use services available from the service provider. For instance, a local profile assistant (e.g., computer-readable instructions) associated with the user equipment 102 can download a profile from a service provider and install the profile on the user equipment 102. As a result, the SIM 114 of the user equipment 102, which can be an eSIM, can be associated with the downloaded profile provided by the service provider. General profile provisioning is defined in GSMA RSP (Remote SIM Provisioning) for consumer devices technical specification standard SGP.22, for example.

In some examples, the SIM 114 can store SIM data 116. The SIM data 116 can include a mobile station international subscriber director number (MSISDN) (e.g., a phone number) of a user associated with the user equipment 102. In some examples, the profile can indicate which service plans, services, functionalities, etc. are available for the user equipment 102 from a particular service provider. The SIM data 116 can include personal data of the user, such as, but not limited to, data associated with the phone number of the user, an address book of the user, text messages sent and received via the user equipment 102, and other data. In some examples, the SIM data 116 can include data associated with profile(s) that can be stored on the SIM 114 or can otherwise be accessible by the SIM 114. In some examples, the SIM data 116 can include service provider data (e.g., current service provider associated with the SIM 114, etc.), brand data (e.g., current brand associated with the SIM 114, etc.), capability data (e.g., which radio access technology(s) the SIM 114 is configured to use, etc.), authentication data, and/or the like.

In some examples, the user equipment 102 can communicate with server(s) 118 associated with the service provider via one or more networks 120. In some examples, the network(s) 120 can include access network(s) (e.g., network(s) that connect users (e.g., user equipment associated therewith) to a service provider (e.g., a telecommunications service provider), provider network(s), a core network (which, in some examples can be a "carrier" network) (e.g., that connects one or more other service providers to one another), etc. In some examples, such network(s) 120 can comprise cellular networks, the Internet, and/or the like.

The server(s) 118 can include one or more components, such as processor(s) 122, network hardware 124, fraud management data 126, and computer-readable media 128. The processor(s) 122 can comprise the same or similar structure and/or function as the processor(s) 104 described above. The computer-readable media 128, can include computer storage media and/or communication media, both of which are described above with reference to the computer-readable media 110. That is, the computer-readable media 128 can have the same or similar structure and/or function as the computer-readable media 110 described above.

The network hardware 124 can provide wired or wireless networking capabilities to the server(s) 118. The network hardware 124 can include or be incorporated into processors, ASICs, programmable circuits such as FPGAs, or in other ways.

The fraud management data 126 can be stored locally with the server(s) 118 (as illustrated) and/or be stored remotely and be accessible to the server(s) 118. The fraud management data 126 can store device data 112 and/or SIM data 114, or a portion thereof, as described above. In some examples, the fraud management data 126 can store data associated with users (which can also be referred to as "subscribers" or "customers"), including but not limited to, data associated with user identities (e.g., identifies corresponding to account holders associated with user equipment), phone numbers of the account holders, address books of the account holders, contacts of the account holders, text messages sent and received via the user equipment, identity and/or service plan profiles (e.g., amount of data, voice calling, and/or text messaging available, whether data, voice calling, and/or text messaging is available internationally, data transmission speeds accessible, plan restrictions, etc.), etc. In some examples, an account can additionally or alternatively include a purchase history of the user account, a billing history associated with the user account, a subscription tier associated with the user account, services associated with the user account, a number of lines associated with the user account, or devices associated with the user account. In some examples, a user account can enable a user to utilize wireless telecommunications services of the service provider, as described above.

The computer-readable media 128 can store management components 130. The management components 130 can include a security component 132, a malicious activity log component 134, and a fraud detection component 136. The security component 132 can be utilized to implement any of the functions of the security controller 202, as discussed below in FIGS. 2 and 3. In some examples, the security component 132 can be implemented as one or more applications that can be executed to operate as the security controller 202. The malicious activity log component 134 can be utilized to implement any of the functions of the logging tool 204, as discussed below in FIGS. 2 and 3. In some examples, the malicious activity log component 134 can be implemented as one or more applications that can be executed to operate as the logging tool 204. The fraud detection component 136 can be utilized to implement any of the functions of the fraud manager 216, as discussed below in FIGS. 2 and 3. In some examples, the fraud detection component 136 can be implemented as one or more applications that can be executed to operate as the fraud manager 216.

The security component 132, individually or in combination with any management component (e.g., any of the remaining management components 130 and/or one or more other management components, as discussed below), can be in a form of a stand-alone application, productivity application, an operating system component, or any other application or software component configured to perform operations as described herein. The malicious activity log component 134, individually or in combination with any management component (e.g., any of the remaining management components 130 or one and/or more other management components, as discussed below), can be in a form of a stand-alone application, productivity application, an operating system component, or any other application or software component configured to perform operations as described herein. The fraud detection component 136, individually or in combination with any management component (e.g., any of the remaining management components 130 and/or one or more other management components, as discussed below), can be in a form of a stand-alone application, productivity application, an operating system component, or any other application or software component configured to perform operations as described herein.

In some examples, at least a portion of the device data 112 and/or the SIM data 114 can be stored in the fraud management data 126. In such examples, any of the management components 130 can access the device data 112 and the SIM data 116 for performing operations thereof, as described herein. In some examples, however, the device data 112 and/or the SIM data 116 may not be stored in the fraud management data 126 and/or some of the device data 112 and/or the SIM data 116 can be stored locally on the user equipment 102, as described above. In such examples, any of the management components 130 can send a request to the user equipment 102 for the device data 112 and/or the SIM data 116. The device data 112 and/or the SIM data 116 can be received from the user equipment 102 and utilized by any the management components 130 to perform the operations as described below in FIGS. 2-4. That is, in some examples, any of the management components 130 can fetch the device data 112 and/or the SIM data 116 from the user equipment 102.

The management components 130 can be stored together or in a distributed arrangement. In some examples, the management component(s) 130 can be implemented as separate components. In other examples, one or more of the management components 130 and/or one or more other management components, as discussed below, can be integrated together and/or implemented as a single component.

In some examples, a group of management components including any number of the management components 130 and/or any number of the other management components, can be integrated together and/or implemented as the single component. In those examples, any number of groups of management components can be provided. The groups can include the group of management components, and/or one or more other groups implemented in a similar way.

Computing resources provided by the management components 130, or by the system 100 that includes the management components 130, can be utilized to implement various services described herein. As discussed above, the system 100, of which the management components 130 are a part, can include the server(s) 118. Any number of the server(s) 118 can be utilized to provide the management components 130. In some examples, one or more of the server(s) 118 can provide any of the management components 130. Additionally or alternatively, one or more other servers in an external system (e.g., a separate system associated with the same service provider, or a separate system associated with a different service provider), which can communicate with the system 100, via the network(s) 120 and/or one or more other networks, can provide any of the management components 130.

Although the security component 132, the malicious activity log component 134, and the fraud detection component 136 are included in the management components 130 as discussed above in this disclosure, it is not limited as such. In some examples, one or more other management components can be utilized additionally or alternatively to the management components 130 (e.g., the security component 132, the malicious activity log component 134, and the fraud detection component 136). Additionally or alternatively to the security component 132, any number of other security components (e.g., one or more other security components in the system 100 and/or one or more other security components in an external system) can be utilized to perform similar functions as the security component 132. Additionally or alternatively to the malicious activity log component 134, any number of other malicious activity log components (e.g., one or more other malicious activity log component in the system 100 and/or one or more other malicious activity log component in an external system) can be utilized to perform similar functions as the malicious activity log component 134. Additionally or alternatively to the fraud detection component 136, any number of other fraud detection components (e.g., one or more other fraud detection components in the system 100 and/or one or more other fraud detection components in an external system) can be utilized to perform similar functions as the fraud detection component 136.

The other security component(s) can perform similar functions as the management components 130. In some examples, one or more of the other security component(s) can perform similar functions as the security component 132, one or more of the other malicious activity log component(s) can perform similar functions as the malicious activity log component 134, and/or one or more of the other fraud detection component(s) can perform similar functions as the fraud detection component 136. One or more of the other security component(s), or a combination of one or more of the other security component(s) and the security component 132, can be implemented as the security component 132. One or more of the other malicious activity log component(s), or a combination of one or more of the other malicious activity log component(s) and the malicious activity log component 134, can be implemented as the malicious activity log component 134. One or more of the other fraud detection component(s), or a combination of one or more of the other fraud detection component(s) and the fraud detection component 136, can be implemented as the fraud detection component 136.

One or more of the other security component(s), one or more of the other malicious activity log component(s), and/or one or more of the other fraud detection component(s) can be provided by the system 100. The system 100 can include any number of the other security component(s), any number of the other malicious activity log component(s), and/or any number of the other fraud detection component(s). Additionally or alternatively, one or more of the other security component(s), one or more of the other malicious activity log component(s), and/or one or more of the other fraud detection component(s) can be provided by one or more external systems. Any of the external system(s) can include any number of the other security component(s), any number of the other malicious activity log component(s), and/or any number of the other fraud detection component(s). Any of the other security component(s) can be provided by the system 100 and/or a combination of the system 100 and one or more external systems. Any of the other malicious activity log component(s) can be provided by the system 100 and/or a combination of the system 100 and one or more external systems. Any of the other malicious fraud detection component(s) can be provided by the system 100 and/or a combination of the system 100 and one or more external systems. Any of the groups of management components, as discussed above, can be provided by the system 100 and/or a combination of the system 100 and one or more external systems.

Figure 2:
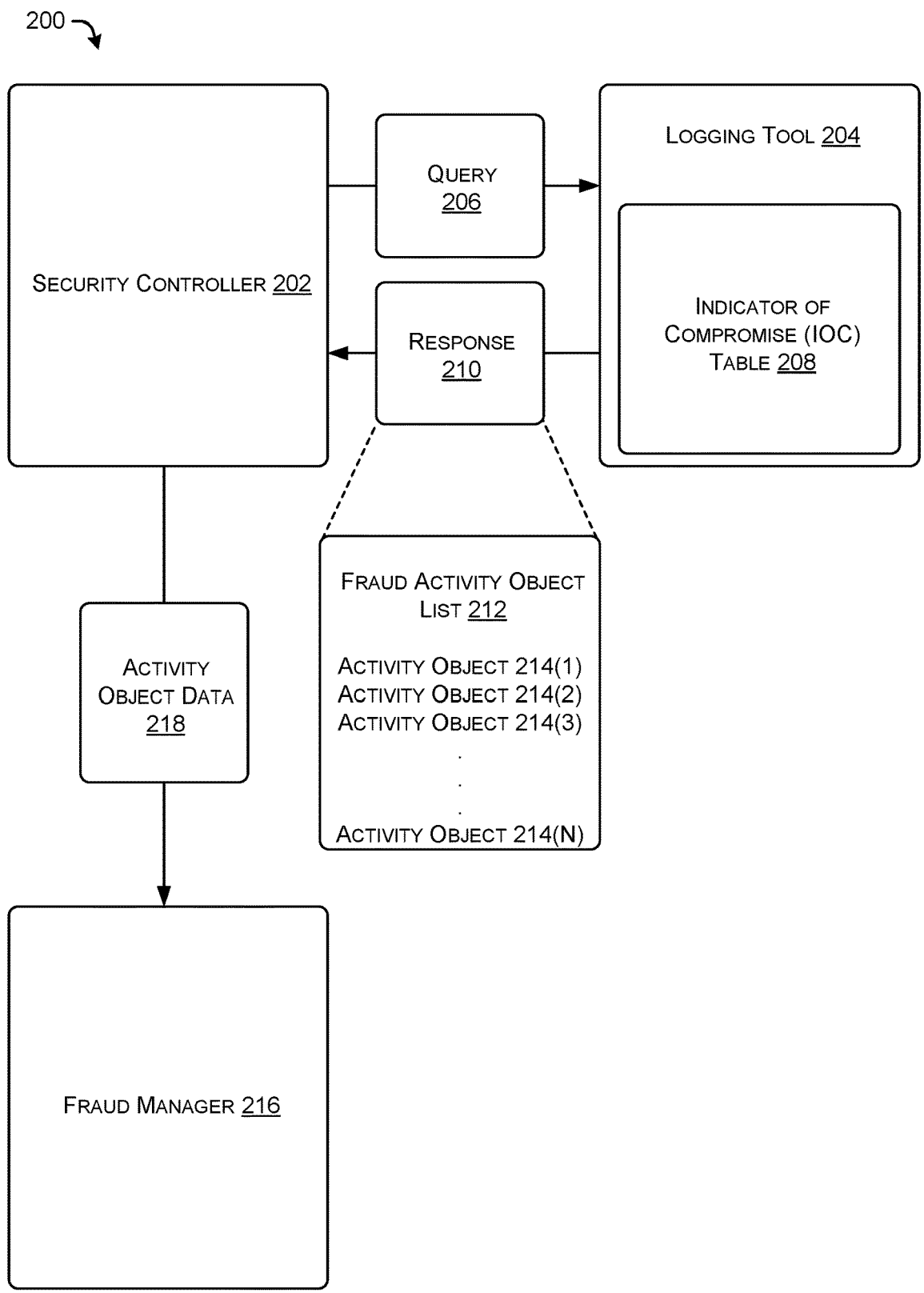
FIG. 2 is a block diagram of a system for automated security control, as described herein.

FIG. 2 is a block diagram of a system 200 for automated security control, as described herein. As shown in FIG. 2, the system 200 can include a security controller 202, a logging tool 204, and a fraud manager 216.

The security controller 202 can perform automated security control to determine activity associated with a malicious actor. The security controller 202 can determine one or more requests are received from a user equipment (e.g., the user equipment 102 discussed above in FIG. 1) (also referred to herein as a "mobile device"). The request(s) can be associated with a subscriber information module (SIM). The security controller 202 can determine information (e.g., request information) associated with the request(s). The request information can include information associated with the request(s), the mobile device, and the SIM. The request information be received within, or as part of, the request(s).

In some examples, the request(s) can include one or more of a request associated with an account (e.g., a request to access an account) provided by a service provider, a request to activate a SIM based on a phone number (also referred to herein as an "account identifier") provided by the service provider, and/or a request to receive a short message service (SMS) short code. The security controller 202 can be utilized to determine whether the request is associated with fraud related activity and/or a malicious actor. Although various requests can be received by the security controller 202 as discussed in this disclosure, it is not limited as such. The security controller 202 can determine whether one or more requests of any type are associated with the fraud related activity and/or the malicious actor in a similar way as for the requests discussed throughout this disclosure.

In some examples, the security controller 202 can determine information utilized to indicate whether a request is received from the malicious actor. The determining of the request information can include the security controller 202 receiving information (e.g., network information) within the request information. The network information can be associated with transmission of the request. In some examples, the network information associated with the transmission of the request can include an IP address assigned to the mobile device. In other examples, the security controller 202 can determine the IP address associated with the user equipment 102 by exchanging of information with the network(s) 120, as discussed above in FIG. 1 (e.g., transmitting requests to, and receiving responses from, the network(s) 120). The IP address can be determined by the server(s) 118 and/or by the exchanging of information with various devices (e.g., any of the server(s) 118 or any other device(s)/server(s) that allocate, manage, and/or store IP addresses (e.g., the IP address utilized by the user equipment 102)) in the network(s) 120.

The determining of the request information can include the security controller 202 determining information associated with the mobile device. The information (e.g., an IMSI) associated with the mobile device can be included in the request information.

The determining of the request information can include the security controller 202 determining information associated with the SIM. The information (e.g., an ICCID associated with the SIM) associated with the SIM can be included in the request information.

Although the information being determined and/or received within the request includes information (e.g., the request information, the user equipment information, and/or the SIM information) associated with a single request, as discussed above in this disclosure, it is not limited as such. Information associated with any number of requests associated with any number of user equipments and/or SIMS can be determined for each of the requests in a similar way as for the request information, discussed above.

The security controller 202 can generate a query based on the request. The query can include, as query information, the information associated with the request. In some examples, the query information can include the request information and/or other information associated with one or more other requests.

In some examples, the query information can include one or more indicators (e.g., query indicator(s)). Each of the query indicator(s) can be associated with any portion of the query information. The query indicator(s) can include an indicator (e.g., an IP address (also referred to herein as a "communication identifier") associated with network information (e.g., the network(s) 120), an indicator (e.g., an IMSI) associated with a mobile device, and/or an indicator (e.g., an ICCID) associated with a SIM.

The security controller 202 can transmit the query to the logging tool 204. The query can be transmitted based on an amount of time (also referred to herein as a "query time") from transmission of a previous query meeting or exceeding a threshold amount of time (also referred to herein as a "threshold query time") (e.g., 30 seconds, 1 minute, 5 minutes, 10 minutes, 30 minutes). In examples, determining the query time can include determining an elapsed time since a previous query.

The logging tool 204 can process the query to determine information (e.g., the query information) in the query utilized for responding to the query. The logging tool 204 can determine log information utilized for responding to the query, based on the query information. The log information utilized to respond to the query can be determined based on a time at which activity associated with the log information occurs. An amount of time (also referred to herein as "activity time") between the time at which the activity associated with the log information occurs and the time at which the query is transmitted can be determined. In examples, the activity time can include an elapsed time since the activity (e.g., malicious activity) associated with the log information occurs, until the query is transmitted. The determining of the log information utilized to respond to the query based on a threshold amount of time (also referred to herein as a "threshold activity time") (e.g., 15 minutes, 1 hours, 24 hours, etc.) included in (e.g., indicated by) the query. The log information utilized to respond to the query can be determined based on the activity time not meeting or exceeding the threshold activity time.

In some examples, a time (e.g., a transmission time) at which the query is transmitted can be included in (e.g., indicated by) the query. In those examples, the logging tool 204 can determine the threshold activity time based on the transmission time. Additionally or alternatively, the threshold activity time can be included in the query and/or indicated by the query. In other examples, the security controller 202 can refrain from including the transmission time and/or the threshold activity time in the query. In those examples, the logging tool 204 can determine the threshold activity time based on an amount of time measured from reception of a previous query (e.g., the reception time of the previous query can be subtracted from the reception time of the current query to determine the activity time.

In some examples, a first threshold query time can be set at 30 seconds; and a first threshold activity time can be set at 15 minutes. In some examples, a second threshold query time can be set at 5 minutes; and a second threshold activity time can be set at 24 hours. The second threshold query time can be set to be larger than the first threshold query time; and the second threshold activity time can set to be larger than the first threshold activity time. By setting the second threshold activity time to be larger than the first threshold activity time, a relatively larger amount of information will likely be retrieved upon processing of a query. The relatively larger amount of information increases a likelihood of determining fraud related activity associated with the query, in a case in which the query is transmitted by a malicious actor. A relatively larger amount of time for processing of the query based on the second threshold query time, ensures that processing of a query ends before processing of a subsequent query begins. The relatively larger second threshold query time allows processing of a relatively larger amount of data to be completed, which is likely to be required due to the relatively larger second threshold activity time.

In some examples, a first query can be transmitted based on the first threshold query time of 30 seconds having passed since a previous query was transmitted. The determining of first log information to respond to the first query can based on the threshold activity time. The determining of the first log information can be further based on a time (e.g., 10:50 AM) at which activity associated with the first log information occurs. The activity time associated with the first log information can be determined as a first amount of time (e.g., 10 minutes) between the time at which activity associated with the first log information occurs and a time (e.g., 11:00 AM) at which the first query is transmitted. The determined first log information can be utilized to respond to the first query based on the activity time of 10 minutes being less than the threshold activity time of 15 minutes, as measured from the time at which the second query is transmitted.

In some examples, a second query can be transmitted based on the second threshold query time of 5 minutes having passed since a previous query was transmitted. The determining of second log information to respond to the second query can based on the threshold activity time. The determining of the second log information can be further based on a time (e.g., 10:00 AM) at which activity associated with the second log information occurs. The activity time associated with the second log information can be determined as a second amount of time (e.g., 1 hour) between the time at which activity associated with the second log information occurs and a time (e.g., 11:00 AM) at which the second query is transmitted. The determined second log information can be utilized to respond to the second query based on the activity time of 1 hour being less than the threshold activity time of 24 hours, as measured from the time at which the second query is transmitted.

The logging tool 204 can determine the log information for responding to the query based on an indicator of comprise (IOC) table 208 (e.g., a table including malicious activity information). The logging tool 204 can manage (e.g., operate, maintain, and/or update) the IOC table 208. The IOC table 208 can include one or more indicators of compromise (IOC). In some examples, an IOC can be included in the IOC table 208 based on information associated with at least one of a fraud related activity or malicious actor. The information associated with the at least one of the fraud related activity or the malicious actor can include transmission information associated a previous fraud related request, a mobile device utilized to transmit the previous fraud related request, and/or SIM associated with the previous fraud related request.

In some examples, the IOC in the IOC table 208 can be associated with the network information associated the previous fraud related request. In those examples, the IOC can be an IP address (e.g., a communication identifier associated with the network(s) 120 and/or a transmission of the request) assigned to the mobile device that transmitted the previous fraud related request. In some examples, the IOC in the IOC table 208 can be associated with the mobile device utilized to transmit the previous fraud related request. In those examples, the IOC can be an IMSI associated with the mobile device. In some examples, the IOC in the IOC table 208 can be associated with the SIM that is associated with the previous fraud related request. In those examples, the IOC can be an ICCID associated with the SIM. In some examples, the IOC can be associated with one or more of the IP address, the IMSI, and the ICCID.

Although the single IOC can be included in the IOC table as discussed in this disclosure, it is not limited as such. Any number of IOCs can be included in the IOC table and implemented in a similar was as the IOC discussed above. Any number of IOCs can be associated with one or more of the IP address, the IMSI, and the ICCID. In other examples, an IOC associated with any of the IP address, the IMSI, and the ICCID can be separate from other IOCs associated with each of the others. In those examples, the IP address can be determined as an IOC (e.g., a first IOC), the IMSI can be determined as an IOC (e.g., a second IOC), and the ICCID can be determined as an IOC (e.g., a third IOC).

The logging tool 204 can determine whether any of the query information is associated with at least one of fraud related activity or a malicious actor. The determination of whether any of the query information is associated with the at least one of the fraud related activity or the malicious actor can be based on the IOC table 208. Any of the query information can be compared to any of the information in the IOC table 208. Each of the indicators (e.g., query indicators) in the query information can be compared to each of the IOCs in the IOC table 208.

The comparing of the query information to information in the IOC table 208 can be performed to determine whether the information matches. Matching information can be utilized to determine whether any of the query information is associated with the at least one of the fraud related activity or the malicious actor. In some examples, any of the query indicators (e.g., the IP address, the IMSI, or the ICCID) that match, or are associated with, any of the IOCs (e.g., the IP address, the IMSI, or the ICCID) in the IOC table 208 can be flagged. In some examples, any portion (e.g., the IP address, the IMSI, and/or the ICCID) of any of the query indicators that match, or are associated with, any portion (e.g., the IP address, the IMSI, and/or the ICCID) of any of the IOCs can be flagged.

The logging tool 204 and/or the IOC table 208 can be utilized to quickly and efficiently process queries to determine whether any portion of the query information is associated with fraud related activity and/or a malicious actor. By utilizing the logging tool 204 and/or the IOC table 208 to determine information associated with the fraud related activity and/or the malicious actor, responses also can be determined quickly and efficiently. The responses can be determined as soon as possible to minimize and/or prevent harm, injury, exposure, and/or infiltration. The responses can be utilized to determine preventative and/or remedial actions. Because the logging tool 204 is able to process the queries much faster than a human operator, fraud related activity can be headed off much quicker and more efficiently. The logging tool 204 is able to process queries to identify the fraud related activity while it is still in process. Identifying the fraud related activity while it is still in process makes it possible to prevent completion of fraud related activity.

The logging tool 204 can determine and transmit a response 210 based on the any of the comparisons. The response 210 can include information (e.g., response information) associated with any portions of the query indicators that match, or are associated with, any of the IOCs. The response information can include portions of the query information (e.g., portions of the query information that match IOCs in the IOC table 208) The response 210 can include a fraud activity object list 212 as the response information. The fraud activity object list 212 can include one or more activity objects 214(1), 214(2), 214(3), . . . 214(N) (collectively activity object(s) 214).

In some examples, the logging tool 204 can refrain from including duplicate query indicators as fraud activity objects 214. The logging tool 204 can determine whether a query indicator determine to be associated with one or more IOCs of the IOC table 208 is associated with, or a duplicate of, one or more other query indicators determined to be associated with one or more IOCs of the IOC table 208. In some examples, the logging tool 204 can determine to refrain from including the other query indicator(s) as activity objects 214. In some examples, the logging tool 204 can determine to include all of the query indicator and the other query indicator(s) as activity objects, to allow the security controller 202 to determine how to handle any duplicates.

An activity object (e.g., an activity object 214(1)) can be determined based on the query indicator (e.g., the query indicator and/or a portion of a query indicator) being associated with an IOC (e.g., an IOC and/or a portion of an IOC). The query indicator (e.g., the IP address, the IMSI, and/or the SIM) being associated with the IOC can include (e.g., the query indicator and/or the portion of a query indicator) matching an IOC (e.g., the IOC and/or the portion of an IOC). In some examples, the activity object 214(1) can include the query indicator and/or the portion of the query indicator. In other examples, the query indicator and/or the portion of the query indicator can be determined as the activity object 214(1) based on the determined similarity and/or the determined match. The activity object 214(1) can include one or more of the IP address, the IMSI, and the ICCID that is associated with and/or matches the IOC (e.g., the IOC and/or the portion of an IOC). Although the single activity object (e.g., the activity object 214(1) can be determined based on various portions of the query information as discussed in this disclosure, it is not limited as such. Any of the activity objects (e.g., the activity objects 214(2), 214(3), . . . 214(N)) can be determined in a similar way as for the activity object 214(1).

The security controller 202 can determine whether to transmit information to a fraud manager 216 based on the response 210. The security controller 202 can determine the response 210 to the query 206 is received. The response 210 can indicate the query information is associated with malicious activity information (e.g., one or more IOCs) stored in the IOC table 208. The information transmitted by the security controller 202 and to the fraud manager 216 can be based on the fraud activity object list 212. In some examples, the information transmitted by the security controller 202 can be based on one or more of the activity objects 214.

The security controller 202 can transmit activity object data 218 to the fraud manger 216. The activity object data 218 can include information indicating the query information is associated with malicious activity information (e.g., one or more IOCs) stored in the IOC table 208. The information in the activity object data 218 can be based on the information in the response 210. In some examples, the security controller 202 can transmit, as the activity object data 218, the fraud activity object list 212 received in the response 210. In those examples, the security controller 202 can transmit, as the activity object data 218, one or more of the activity objects 214.

The security controller 202 can transmit the activity object data 218 to the fraud manager 216 as a text file. In some examples, the text file can include a list of phone numbers associated with the fraud activity object list 212. The list of phone numbers can include each of the phone numbers that is determined by the logging tool 204 to be associated with fraud related activity and/or a malicious actor. By transmitted the text file that includes the list of phone numbers, the fraud manager 216 can easily and quickly process the text file. The fraud manager 216 receiving and processing the text file with the list of phone numbers alleviates any need for a specific protocol to be used for transmission of the activity object data 218. Any compatibility concerns between various portions (e.g., the security controller 202 and the fraud manager 216) of the system 200 can be avoided by formatting the activity object data 218 as the text file. By transmitting, as the activity object data 218, the list of phone numbers instead of the fraud activity object list 212, an amount of information that is transmitted can be minimized. By transmitting the list of phone numbers as the activity object data 218, complexity associated with processing the activity object data 218 can be reduced.

In some examples, the security controller 202 can determine whether any of the activity objects 214 received in the response 210 from the logging tool 204 is a duplicate of another one of the activity objects 214 received in the response 210. Additionally or alternatively, the security controller 202 can determine whether one of the activity objects 214 received from the logging tool 204 is a duplicate of any activity object received in any of one or more previous responses received from the logging tool 204. The security controller 202 can determine to refrain from including the duplicate activity object in the activity object data 218. By refraining from including the duplicate activity object 214 in the activity object data 218, the security controller 202 can reduce network congestion. The security controller 202 can eliminate a necessity for unnecessary resource consumption by avoiding transmission of the duplicate activity object. Transmitting a smaller amount of data and results in less overhead associated with the fraud manager 216.

In some examples, the security controller 202 can transmit information associated with an action to be performed. The information associated with the action to be performed can be transmitted, individually or in combination with, the activity object data 218 (e.g., separate from, or within, the activity object data 218). The information associated with the action to be performed can be included in the activity object data 218 based on the query information. Additionally or alternatively, the information associated with the action to be performed can be included in the activity object data 218 based on the response information (e.g., the fraud activity object list 212). In some examples, the information associated with the action can include instructions and/or a command. The action to be performed can include one or more of a line suspension operation, a SIM block operation, or a short message service (SMS) short code refusal operation. Any of the operations performed as the action can be performed by processing and/or transmitting a command (e.g., the line suspension operation being performed by processing and/or transmitting a line suspension command, the SIM block operation being performed by processing and/or transmitting a SIM block command, the SMS short code refusal operation being performed by processing and/or transmitting a SMS short code refusal command, etc.). The instructions and/or the command transmitted by the security controller 202 can be processed and/or executed by the fraud manager 216. In some examples, the security controller 202 can refrain from sending the instructions and/or the command. In those examples, the security controller 202 can allow the fraud manager 216 to determine how to processes the activity object data 218 and/or proceed based on the activity object data 218.

The fraud manager 216 can perform operations to minimize, eliminate, correct, and/or redress fraud related activity. The fraud manager 216 can perform operations based on the information received from the security controller 202. The fraud manager 216 can receive and process the activity object data 218. The fraud manager 216 can determine operations to perform based on the activity object data 218. In such cases in which instructions and/or command(s) were received from the security controller 202, the fraud manager 216 can process such instructions and/or execute such command(s).

The fraud manager 216 can perform one or more actions based on whether any fraud related activity is currently in progress. The fraud manager 216 can utilize the activity object data 218 to determine whether any fraud related activity is likely to commence, currently being attempted (e.g., is in progress), or is already completed. The fraud manager 216 can perform an inspection of any systems that include information associated with user accounts provided by the service provider. The inspection can be performed by taking inventory of the user accounts associated with the activity object data 218. The fraud manager 216 can determine activity associated with any of the activity object data 218 (e.g., any user accounts associated with the activity object data 218) is occurring.

In some examples, the fraud manager 216 can determine whether communication of any type associated with the activity object data 218 and/or any of the user accounts is occurring. In those examples, the fraud manager 216 can utilize the activity object data 218 to gather information associated with the activity object data 218 (e.g., the information in the activity object data 218 and/or the user account(s) associated with the activity object data 218). In a case in which the activity object data 218 includes a list of phone numbers, the fraud manager 216 can determine any activity associated with any of the phone numbers (e.g., the user accounts associated with the phone numbers).

The communication can include various types of communication for various purposes. The communication can include one or more phone calls being made or currently in progress, one or more text messages being transmitted and/or received, one or more requests being received from an online application or computer program, etc. The communication can be utilized to access one or more user account(s). In some examples, the fraud manager 216 can determine that a user account in the activity object data 218 is being accessed. The fraud manager 216 can determine that a request to access the user account has been received. Additionally or alternatively, the fraud manager 216 can determine that the user account is being accessed to obtain information, make changes, etc. The user account access request determination can be made before, during, or after one or more requests are received for access to the user account. The fraud manager 216 can perform an operation (e.g., transmit and/or process a line suspension command) associated with the user account. The line suspension command can be utilized to discontinue and/or block access to the user account.

In some examples, the fraud manager 216 can determine that a user account in the activity object data 218 is associated with a SIM swap request. In those examples, the SIM swamp request determination can be made before, during, or after communication and/or operations to access the user account has completed. Additionally or alternatively, the SIM swamp request determination can be made before, during, or after one or more requests are received for access to the user account. The fraud manager 216 can perform an operation (e.g., transmit and/or process a SIM block command) associated with the user account. The SIM block command can be utilized to prevent the SIM swap from occurring.

By utilizing portions of the system 200 (e.g., the security controller 202 and/or the logging tool 204), the fraud manager 216 can quickly and effectively respond to fraud related activity. Responses by the fraud manager 216 can include detection of fraud related activity (e.g., phone call(s) associated with user account(s) and performance of associated operations (e.g., the SIM block command), while the fraud related activity is in progress. An entire process of determining any activity is fraud related activity and responding accordingly can occur after a period of time between a time at which the fraud related activity begins (e.g., the phone call is made), and before a time at which the fraud related activity is completed (e.g., before the SIM swap occurs).

In some examples, the fraud manager 216 can determine that a user account in the activity object data 218 is associated with a short message service (SMS) short code request. In those examples, the short message service (SMS) short code request determination can be made before, during, or after communication and/or operations to access the user account has completed. Additionally or alternatively, the SMS short code request determination can be made before, during, or after one or more requests are received for access to the user account. The fraud manager 216 can perform an operation (e.g., transmit and/or process an SMS short code refusal command) associated with the user account. The SMS short code refusal command can be utilized to prevent the SMS short code from being transmitted. An entire process of determining any activity is fraud related activity and responding accordingly can occur after a period of time between a time at which the fraud related activity begins (e.g., the phone call is made), and before a time at which the fraud related activity is completed (e.g., before transmission of the SMS short code occurs).

In a rare case in which determination of the fraud related activity is not performed quickly enough to prevent the SIM swap from occurring, determination of the fraud related activity can be performed prior to transmission of the SMS short code. The transmission of the SMS short code can be avoided even though the SIM swap could not be avoided. Although the refusal of transmission of the SMS short code might occur after the SIM swap occurs, harm that would otherwise result from transmission of the SMS short code can be avoided.

In some examples, the fraud manager 216 can utilize discretion (e.g., independent discretion) for processing the instructions and/or command(s) received from the security controller 202. In those examples, the fraud manager 216 can determine whether to process the instructions and/or commands received from the security controller 202. Additionally or alternatively, the fraud manager 216 can determine how much (e.g., which portion or portions) of the instructions and/or commands to process. The fraud manager 216 can process the determined portion(s) (e.g., no portions, some portions, or all portions) of the instructions and/or commands. In some examples, the fraud manager 216 can refrain from utilizing independent discretion for processing the instructions and or command(s) received from the security controller 202. In those examples, the fraud manager 216 can automatically process, without alteration, the instructions and or command(s) received from the security controller 202.

Although the activity object data 218 processed by the fraud manager 216 can include the list of phone numbers as discussed in this disclosure, it is not limited as such. Any type of information in the activity object data 218 can be utilized by the fraud manager 216 is a similar way as for the list of phone numbers. By way of example, the fraud manager 216 can determine whether any fraud related activity is in progress by inspecting activity associated with IP address(es), IMSI(s), and/or ICCID(s) in the activity object data 218 (e.g., inspective activity associated with user accounts accessed using the IP address(es), IMSI(s), and/or ICCID(s)).

Although various types of instruction(s)/command(s) associated with fraud related activity are discussed in this disclosure, it is not limited as such. The line suspension command and/or any other type of instruction(s)/command(s) suitable for preventing malicious actors from accessing a user account can be performed to block access to the user account. The SIM block command and/or any other type of instruction(s)/command(s) suitable for preventing malicious actors from completing a SIM swap can be performed to block the SIM from being swapped. The SMS short code refusal command and/or any other type of instruction(s)/command(s) suitable for preventing malicious actors from receiving an SMS short code can be performed to block the SMS short code from being sent.

Figure 3:
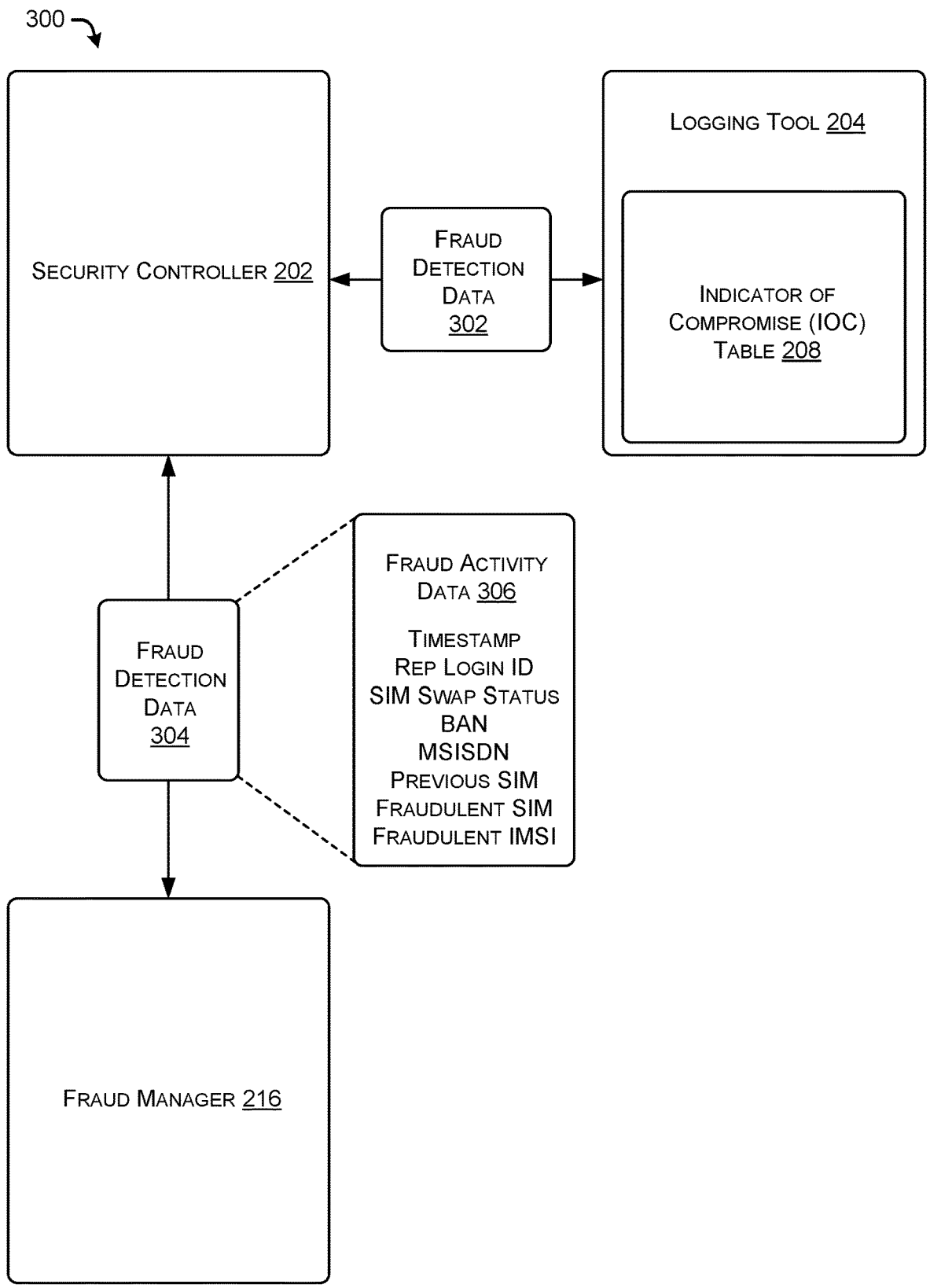
FIG. 3 is a block diagram of a system for backing up and updating fraud activity data, as described herein.

FIG. 3 is a block diagram of a system 300 for backing up and updating fraud activity data, as described herein. As shown in FIG. 3, the system 300 can include the security controller 202, the logging tool 204, and the fraud manager 216, as discussed above in FIG. 2.

The security controller 202 can propagate information between the logging tool 204 and the fraud manager 216. The security controller 202 can transmit information (e.g., one or more indicators associated with fraud related activity), as feedback (e.g., feedback information), to the logging tool 204. The feedback information can be transmitted to the logging tool 204 as fraud detection data 302. The security controller 202 can utilize information received from the fraud manager 216 to update the logging tool 204. The logging tool 204 can perform an update of the IOC table 208 based on the information received from the fraud manager 216 not matching any of the information (e.g., any current information) in the IOC table 208. The fraud detection data 302 can include information (e.g., malicious activity information (e.g., one or more indicators associated with fraud related activity)) received from the fraud manager 216. Any of the indicator(s) (e.g., the indicator(s) associated with fraud related activity) received from the fraud manager 216 can be transmitted, as feedback, to the logging tool 204.

In some examples, the information determined to be transmitted as the fraud detection data 302 can be received from the fraud manager 216, one or more other systems with which the fraud manager 216 exchanges information, one or more other systems (e.g., internal system(s) associated with the same service provider and/or external system(s) associated with one or more other service providers) with which any other component (e.g., the security controller 202, etc.) in the system 200 exchanges information, and/or any information associated with user account(s) provided by the service provider and/or other service provider(s).

In some examples, the logging tool 204 can add the indicator(s) received as feedback to a backup IOC table (e.g. the indicator(s) can be added as IOCs (e.g., backup IOCs) to the backup IOC table). The backup IOC table can be implemented in a similar way as the IOC table 208. The logging tool 204 can add any IOCs from the backup IOC table to the IOC table 208. Adding the IOCs from the backup IOC table to the IOC table 208 can be performed by the logging tool 204. In some examples, the IOCs can be added the backup IOC table based on the information from the security controller 202 in real-time, in near real-time, or on a rolling basis using a buffer to propagate the indicators received from the security controller 202 into the backup IOC table. Adding the IOC(s) (e.g., backup IOCs) from the backup IOC table to the IOC table 208 can be performed after a time interval from previous adding the backup IOCs to the IOC table 208. The backup IOCs can be added periodically.

In some examples, the backup IOCs can be added after a period of time from a time at which the previous backup was performed and a current time exceeds a threshold period of time. One or more of the backup IOCs can be added to an end of the IOC table 208 (e.g., appended to the end the IOC table). In some examples, the IOCs in the IOC table 208 can be resorted based on a sorting criteria (e.g., a time at which the IOCs were detected, a number of fraud related activities are associated with the IOCs, a severity of the fraud related activities associate with the IOCs (e.g., a level of financial loss resulting from the fraud related activities, a number of user accounts affected by the fraud relative activities, etc.).

Although the sorting of the IOC table 208 after the backup IOCs are added to the IOC table is discussed in this disclosure, it is not limited as such. Any sorting as discussed above can be performed for the IOC table 208 at any time (e.g., after any query (e.g., any of the query(ies) 206) is received, after any response (e.g., any of the response(s) 210) is transmitted, after any new indicators are received from any external system, etc.).

The security controller 202 can transmit fraud detection data 304, as feedback (e.g., feedback information), to the fraud manager 216. The fraud manager 216 can store the fraud detection data 304 (e.g., any information in the fraud detection data 304). The fraud manager 216 can store a table (e.g., a fraud detection data table) including one or more portions of the fraud detection data 304. In some examples, the fraud manager 216 can store an IOC table that is implemented in a similar way as the IOC table 208. The fraud detection data table and the IOC table stored in the fraud managers can be stored individually or in combination. Any information (e.g., the IOC table stored in the fraud manager 216, the table including the information in the fraud activity data 306, and/or other information) stored by the fraud manager 216 can be updated based on the fraud detection data 304 received from the security controller 202. The security controller 202 can utilize information received from various sources as the fraud detection data 304. The security controller 202 can utilize information received from the logging tool 204 as the fraud detection data 304.

In some examples, the security controller 202 can receive the fraud detection data 302 as feedback (e.g., feedback information) from the logging tool 204. The fraud detection data 302 received from the logging tool 204 can include the IOC table 208 (e.g., one or more IOCs in the IOC table 208). The fraud detection data 302 transmitted by the security controller 202 can be include the same type of information or different types of information as the fraud detection data 302 transmitted by the logging tool 204. Information included in the fraud detection data 304 can be determined based on information received from any other security controller in the system 200 and/or one or more external systems (e.g., other system(s) associated with the same service provider, other system(s) associated with one or more other service providers, and/or any information associated with user account(s) provided by the service provider and/or other service provider(s)). The security controller 202 can utilize information received in the fraud detection data 302 from the logging tool 204, as one or more portions of the fraud detection data 304. The fraud detection data 302 exchanged back and forth between the security controller 202 and the logging tool 204 can happen on an ongoing basis in either direction and/or both directions.

The fraud detection data 304 can include various types of data including fraud activity data 306. The fraud activity data 306 can include a timestamp associated with fraud related activity. The fraud related activity can include information associated with communication. The communication can include one or more phone calls being made or currently in progress, one or more text messages being transmitted and/or received, one or more requests being received from an online application or computer program, etc., as discussed above with relation to FIG. 2.

The fraud activity data 306 can include a representative login identification (ID) (also referred to herein as "Rep Login ID"). The representative login identification can include an account name and an active directory associated with an account provided by a service provider. The representative login identification can be associated with a representative targeted by fraud related activity.

The fraud activity data 306 can include a SIM swap status. The SIM swap status can include information (e.g., a status of the SIM swap as incomplete, complete, in progress, etc.) about a SIM swap associated with fraud related activity and/or a malicious actor.

The fraud activity data 306 can include a billing account number (BAN). The billing account number can be utilized to identify a customer account provided by the service provider. The billing account number can be associated with fraud related activity and/or a malicious actor.

The fraud activity data 306 can include an MSISDN (e.g., a phone number). The MSISDN can be associated with fraud related activity and/or a malicious actor.

The fraud activity data 306 can include a previous SIM. The previous SIM (e.g., previous ICCID) can be a SIM associated with a malicious actor prior to a SIM swap requested by the malicious actor.

The fraud activity data 306 can include a fraudulent SIM. The fraudulent SIM (e.g., fraudulent ICCID) can be a SIM associated with a malicious actor after a SIM swap requested by the malicious actor. The fraudulent SIM can be the SIM to which a phone number is associated, after the SIM swamp by the malicious actor.

The fraud activity data 306 can include a fraudulent IMSI. The fraudulent IMSI can be an IMSI associated with a mobile device utilized by malicious actor for fraud related activity. By way of example, the fraudulent IMSI can be utilized to identify the mobile device utilized to perform the SIM swap.

The fraud manager 216 can transmit information as fraud detection data 304 to the security controller 202. The fraud detection data 304 transmitted by the security controller 202 can include the same type of information or different types of information as the fraud detection data 304 transmitted by the fraud manager 216. In some examples, the fraud detection data 304 transmitted by the fraud manager 216 can include timestamp(s), representative login ID(s), SIM swap status(es), BAN(s), MSISDN(s), previous SIM(s), fraudulent SIM(s), and/or fraudulent IMSI(s). The security controller can utilize the fraud detection data 304 to update the logging tool 204. Any updates (e.g., backups) made by the logging tool 204 to the IOC table 208 can include one or more portions of information received from the security controller 202, based on the fraud detection data 304 transmitted by the fraud manager 216. The fraud detection data 304 exchanged back and forth between the security controller 202 and the fraud manager 216 can happen on an ongoing basis in either direction and/or both directions. The fraud detection data 302 (e.g., transmitted in either direction) can include the same type of information or different types of information as the fraud detection data 304 (e.g., transmitted in either direction).

Figure 4:
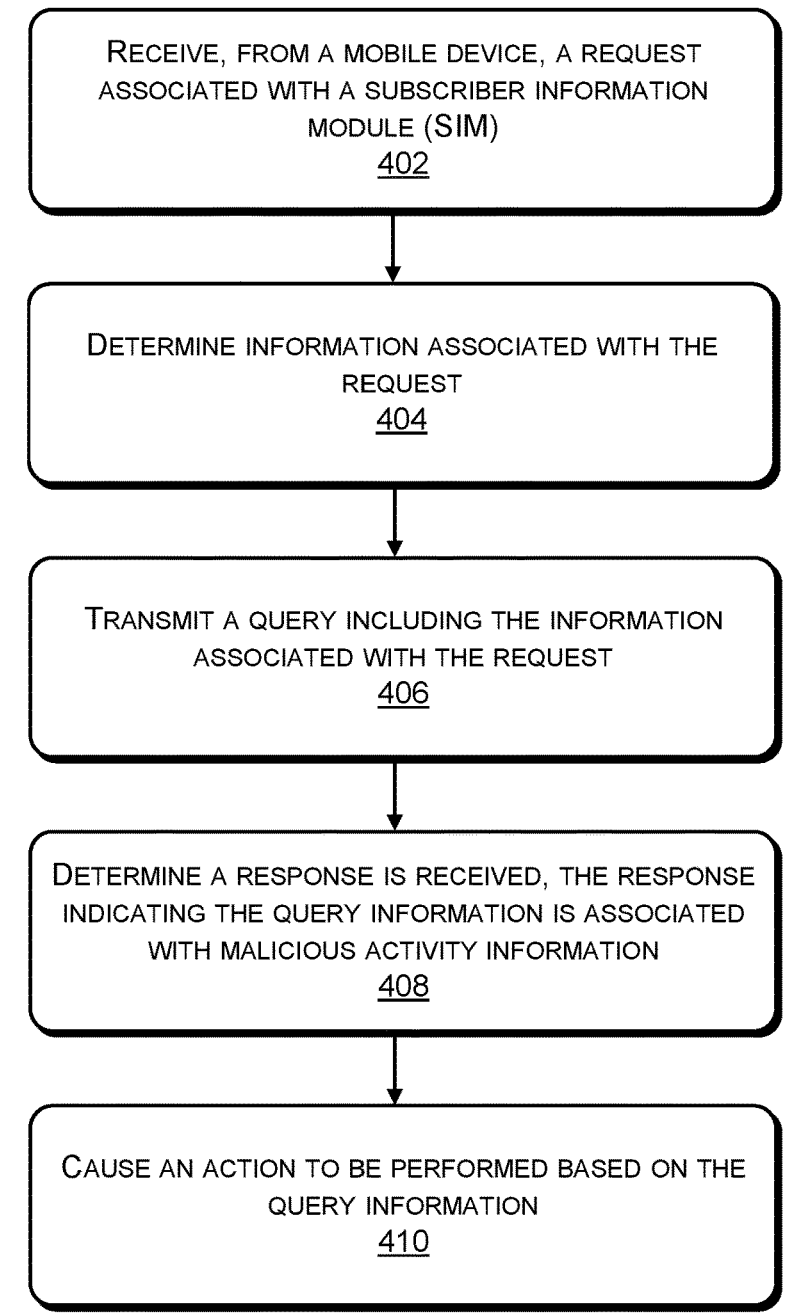
FIG. 4 illustrates an example process for automated security control using log information to determine fraud related activity, as described herein.

FIG. 4 illustrates an example process for automated security control for user accounts using log information of fraud related activity, as described herein.

The example process 400 can be performed by one or more server computers (e.g., server(s) 118) or another component, in connection with other components discussed herein.

At operation 402, the process can include receiving a request associated with a subscriber information module (SIM) 114. The request can be received from a mobile device 102 and by a security controller 202. The request can include request information. The request information can include an IP address, an international mobile subscriber identity (IMSI), and an integrated circuit card identifier (ICCID).

At operation 404, the process can include determining information (e.g., the request information) in the request. The information can be associated with at least one of the mobile device 102, the SIM 114, or a communication of the request. The information associated with the mobile device 102 can include the IMSI. The information associated with the SIM 114 can include the ICCID. The information associated with the communication of the request can include the IP address.

At operation 406, the process can include transmitting a query to a logging tool 204. The query can be transmitted based on an elapsed time (e.g., an elapsed time since a previous query) meeting or exceeding a threshold amount of time. In some examples, the elapsed time can be a difference between a first time associated with the query and a second time associated with the previous query. The query can include, as query information, the information associated with the request.

At operation 408, the process can include determining a response to the query is received. The response can be received by the security controller 202 and from the logging tool 204. The response can indicate the query information is associated with malicious activity information stored in an indicator of compromise (IOC) table 208.

At operation 410, the process can include causing an action to be performed. The action can be performed based on the query information being associated with the malicious activity information. The action can be performed by a fraud manager 216.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A system, comprising:
one or more processors; and
memory storing computer-executable instructions that, when executed by the one or more processors, cause the one or more processors to perform operations comprising:
receiving, from a mobile device and via a network, a request associated with a subscriber information module (SIM);
determining information in the request, the information being associated with at least one of the mobile device, the SIM, or the network;
transmitting a query, based at least in part on an elapsed time since a previous query meeting or exceeding a threshold amount of time, the query including, as query information, the information associated with the request;
determining that a response to the query is received, the response indicating the query information is associated with malicious activity information stored in a table; and
causing an action to be performed based at least in part on the query information being associated with the malicious activity information, wherein:
the request is associated with an internet protocol (IP) address;
the malicious activity information includes previous request information associated with a previous request; and
the IP address is a same IP address that is associated with the previous request information.

2. The system of claim 1, wherein causing the action to be performed further comprises causing a line suspension operation to be performed.

3. The system of claim 1, wherein causing the action to be performed further comprises causing a SIM block operation to be performed.

4. The system of claim 1, wherein:
the malicious activity information is associated with a malicious activity; and a second elapsed time since the malicious activity until the query is transmitted is less than a second threshold amount of time.

5. The system of claim 1, wherein the response is determined based on a first indicator in the response matching a second indicator in the table, the second indicator being an indicator of compromise (IOC).

6. The system of claim 1, wherein causing the action to be performed further comprises causing a short message service (SMS) short code refusal operation to be performed.

7. The system of claim 1, the action being performed by a fraud manager, the operations further comprising:
transmitting a feedback request to the fraud manager;
receiving a feedback response from the fraud manager, based at least in part on the feedback request, the feedback response including additional malicious activity information; and
causing the additional malicious activity information to be stored in the table.

8. The system of claim 1, wherein transmitting the query further comprises transmitting the query to a logging tool, the operations further comprising:
receiving additional malicious activity information; and
transmitting the additional malicious activity information to the logging tool, the logging tool adding the additional malicious activity information to the table, based at least in part on the additional malicious activity information not matching current information in the table.

9. The system of claim 1, wherein:
the table is an indicator of compromise (IOC) table maintained by a logging tool; and
the malicious activity information includes IOCs in the IOC table.

10. The system of claim 1, the operations further comprising:
generating a text file including the query information; and
transmitting the text file to a fraud manager,
wherein causing the action to be performed further comprises causing the action to be performed by the fraud manager, based at least in part on the query information in the text file.

11. One or more non-transitory computer-readable media storing instructions that, when executed, cause one or more processors to perform operations comprising:
receiving, from a mobile device and via a network, a request associated with a subscriber information module (SIM);
determining information in the request, the information being associated with at least one of the mobile device, the SIM, or the network;
transmitting a query, based at least in part on at least in part on an elapsed time since a previous query meeting or exceeding a threshold amount of time, the query including, as query information, the information associated with the request;
determining a response to the query is received, the response indicating the query information is associated with malicious activity information stored in a table; and
causing an action to be performed based at least in part on the query information being associated with the malicious activity information, wherein:
the request includes an integrated circuit card identifier (ICCID);
the malicious activity information includes previous request information received in a previous request; and
the ICCID is a same ICCID that is included in the previous request information.

12. The one or more non-transitory computer-readable media of claim 11, wherein causing the action to be performed further comprises causing a line suspension operation to be performed.

13. The one or more non-transitory computer-readable media of claim 11, wherein causing the action to be performed further comprises causing a SIM block operation to be performed.

14. The one or more non-transitory computer-readable media of claim 11, wherein:
the malicious activity information is associated with a malicious activity; and
a second elapsed time since the malicious activity until the query is transmitted is less than a second threshold amount of time.

15. The one or more non-transitory computer-readable media of claim 11, wherein the response is determined based on a first indicator in the response matching a second indicator in the table, the second indicator being an indicator of compromise (IOC).

16. A method comprising:
receiving, from a mobile device and via a network, a request associated with a subscriber information module (SIM);
determining information in the request, the information being associated with at least one of the mobile device, the SIM, or the network;
transmitting a query, based at least in part on an elapsed time since a previous query meeting or exceeding a threshold amount of time, the query including, as query information, the information associated with the request;
determining a response to the query is received, the response indicating the query information is associated with malicious activity information stored in a table; and
causing an action to be performed based at least in part on the query information being associated with the malicious activity information, wherein:
the request is associated with an internet protocol (IP) address;
the malicious activity information includes previous request information associated with a previous request; and
the IP address is a same IP address that is associated with the previous request information.

17. The method of claim 16, wherein causing the action to be performed further comprises causing a short message service (SMS) short code refusal operation to be performed.

18. The method of claim 16, the action being performed by a fraud manager, further comprising:
transmitting a feedback request to the fraud manager;
receiving a feedback response from the fraud manager, based at least in part on the feedback request, the feedback response including additional malicious activity information; and
causing the additional malicious activity information to be stored in the table.

* * * * *